(12) United States Patent
Smith et al.

(10) Patent No.: US 12,378,106 B2
(45) Date of Patent: *Aug. 5, 2025

(54) PORTABLE FUEL METERING SYSTEM

(71) Applicant: Nautical Control Solutions, LP, Spring, TX (US)

(72) Inventors: Thomas Smith, Houston, TX (US); John Donovan, Spring, TX (US); Emerson Ornstein, Houston, TX (US); Brian Doyle, Conroe, TX (US); Anthony George, The Woodlands, TX (US)

(73) Assignee: Nautical Control Solutions, LP, Spring, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/911,873

(22) Filed: Oct. 10, 2024

(65) Prior Publication Data

US 2025/0033950 A1 Jan. 30, 2025

Related U.S. Application Data

(63) Continuation of application No. 17/816,245, filed on Jul. 29, 2022, now Pat. No. 12,116,262.
(Continued)

(51) Int. Cl.
*B67D 7/04* (2010.01)
*G01D 4/00* (2006.01)

(52) U.S. Cl.
CPC .......... *B67D 7/0401* (2013.01); *G01D 4/004* (2013.01); *B67D 2007/043* (2013.01); *B67D 2007/0465* (2013.01)

(58) Field of Classification Search
CPC .......... B67D 7/0401; B67D 2007/043; B67D 2007/0465; G01D 4/004
See application file for complete search history.

(56) References Cited

U.S. PATENT DOCUMENTS 6,648,032 B1 11/2003 Kelrich et al.
7,757,726 B2 7/2010 Handa
(Continued)

FOREIGN PATENT DOCUMENTS

CN 103557892 2/2014
CN 205642478 10/2016
(Continued)

OTHER PUBLICATIONS

International Search Report and Written Opinion regarding corresponding PCT Application No. PCT/US2022/074329, mailed Nov. 21, 2022.

*Primary Examiner* — Timothy L Maust
(74) *Attorney, Agent, or Firm* — Lewis & Reese, PLLC

(57) ABSTRACT

A portable fuel metering system (PMU) is described. The PMU has one or more flow meters capable of metering the flow of fluids, such as fuel, as the fluid is transferred from a source to a receiver. The PMU may include a telemetry unit configured to transmit parameters related to the fuel transfer to remote location. The PMU may be configured in a light, portable package that may be carried by one or two people. The PMU may include a power generator that is configured to use the flow of fluid to the PMU to generate power for the PMU's operation.

20 Claims, 5 Drawing Sheets

Related U.S. Application Data

(60) Provisional application No. 63/268,540, filed on Feb. 25, 2022, provisional application No. 63/229,056, filed on Aug. 3, 2021.

(56) References Cited

U.S. PATENT DOCUMENTS

| | | | |
|---|---|---|---|
| 8,162,261 | B2 | 4/2012 | Stecko et al. |
| 11,130,669 | B2 * | 9/2021 | Williams ................. B67D 7/34 |
| 11,248,943 | B2 | 2/2022 | George et al. |
| 12,116,262 | B2 * | 10/2024 | Smith ..................... B67D 7/20 |
| 2003/0167919 | A1 | 9/2003 | Schempf |
| 2014/0311619 | A1 | 10/2014 | Herp et al. |
| 2021/0063218 | A1 | 3/2021 | George et al. |

FOREIGN PATENT DOCUMENTS

| | | |
|---|---|---|
| CN | 107976224 | 5/2018 |
| JP | 5920416 | 5/2016 |
| WO | 2018/104960 | 6/2018 |
| WO | 2021/004997 | 1/2021 |

* cited by examiner

PORTABLE FUEL METERING SYSTEM

CROSS REFERENCE TO RELATED APPLICATIONS

This is a continuation application of U.S. patent application Ser. No. 17/816,245, filed Jul. 29, 2022, which is a non-provisional application of U.S. Provisional Patent Application Ser. No. 63/268,540, filed Feb. 25, 2022 and U.S. Provisional Patent Application Ser. No. 63/229,056, filed Aug. 3, 2021. These applications are incorporated by reference in their entirety, and priority is claimed to each.

INTRODUCTION

In many situations there is a need to monitor the status of fuel stores and fuel transfers in remote locations. U.S. Patent Application Publication Pub. No. US 2021/0063218 ("the '218 Publication") describes a mobile fuel monitoring system (MMU). The contents of the '218 Publication is hereby incorporated herein by reference in its entirety. The fuel monitoring system disclosed in the '218 Publication may be skid mounted and is configured to monitor fuel transfers between a fuel source and a vessel, such as a ship. The MMU is a stand-alone, self-contained unit that can be easily moved from place to place. The MMU is configured to monitor and remotely report custody transfers of fuel performed at any location. Parameters of the fuel transfer operation, such as the amount of fuel transferred, the flow rate, the fuel density, and fuel temperature can be monitored and alarms may be issued if any of the parameters are out of specification. The parameter values may be transmitted to a remote location, for example, via a satellite link. There is an interest in fuel monitoring systems with functionality similar to that of the MMU described in the '218 Publication, but that is smaller, lighter, and more self-contained.

SUMMARY

Disclosed herein is a system for monitoring a transfer of fuel between a fuel source and a fuel receiver, the system comprising: a portable metering unit (PMU) configurable between the fuel source and fuel receiver so that fuel flows through the PMU during the transfer, wherein the PMU comprises: a flow meter comprising one or more sensors configured to measure one or more parameters of the fuel as it a flows between the fuel source and the fuel receiver, wherein the one or more parameters comprises flow rate; a telemetry unit configured to telemeter data indicative of the one or more parameters to a remote location, and a power generation unit comprising a generator configured to generate power for the flow meter and the telemetry unit by converting energy of fuel flowing through the power generation unit into electrical energy. According to some embodiments, the PMU is less than 200 pounds. According to some embodiments, the PMU is less than 100 pounds. According to some embodiments, the PMU comprises a global positioning system (GPS) transceiver. According to some embodiments, the one or more sensors comprise ultrasonic flow sensors. According to some embodiments, the power generation unit comprises a flow path and an impeller configured so that fluid flowing through the flow path activates the impeller. According to some embodiments, the impeller is bidirectional. According to some embodiments, the power generation unit further comprises a rotor and a stator configured so that activation of the impeller causes the rotor to rotate within the stator, thereby generating electric current in the stator. According to some embodiments, the impeller is connected to the rotor by a shaft that passes through a bearing assembly configured between the impeller and the rotor, wherein the bearing assembly is permeable to fuel within the flow path. According to some embodiments, the rotor is configured within a rotor housing one or more walls configured between the rotor and the stator. According to some embodiments, the rotor housing defines a rotor compartment configured to contain the rotor and configured such that fuel from the flow path may seep into the rotor compartment. According to some embodiments, the PMU further comprises one or more batteries configured to store electrical energy generated by the power generation unit. According to some embodiments, the PMU further comprises a display configured to display one or more of the measured parameters. According to some embodiments, the PMU is configured to receive data from one or more sensors configured on the fuel source. According to some embodiments, the one or more sensors configured on the fuel source comprise one or more of weight sensors, volume sensors, level sensors, density sensors, and temperature sensors. According to some embodiments, the telemetry unit comprises a satellite antenna.

Also disclosed herein is a method of monitoring a transfer of fuel between a fuel source and a fuel receiver, the method comprising: configuring a portable metering unit (PMU) between the fuel source and fuel receiver by attaching a first fuel line from the fuel source to an input connector of the PMU and attaching a second fuel line from an output connector of the PMU to the fuel receiver, so that fuel flows through the PMU during the transfer, wherein the PMU comprises: a flow meter comprising one or more sensors configured to measure one or more parameters of the fuel as it flows between the fuel source and the fuel receiver, wherein the one or more parameters comprises flow rate, a telemetry unit configured to telemeter data indicative of the one or more parameters to a remote location, and a power generation unit comprising a generator configured to generate power for the flow meter and the telemetry unit by converting energy of fuel flowing through the power generation unit into electrical energy. According to some embodiments, the power generation unit comprises: a flow path and an impeller configured so that fluid flowing through the flow path activates the impeller. According to some embodiments, the power generation unit further comprises a rotor and a stator configured so that activation of the impeller causes the rotor to rotate within the stator, thereby generating electric current in the stator. According to some embodiments, the PMU weighs less than 200 pounds.

DETAILED DESCRIPTION

Aspects of this disclosure relate to a portable metering unit (PMU) configured to monitor fluid transfers, such a fuel transfers. The PMU is configured to monitor fuel as it is transferred from a fuel source to a fuel receiver. Embodiments of the disclosed PMU address some of the deficiencies discussed above. For example, embodiments of the disclosed PMU may be very light, weighing for example, less than 200 lbs., or less than 150 lbs., or less than 100 lbs. For example, some disclosed embodiments of a PMU may be carried by one or two people. Embodiments of the disclosed PMU may use batteries, such as rechargeable batteries, and may generate their own power for recharging the batteries. As with the MMU mentioned above, embodiments of the PMU are capable of telemetering measured/metered data to remote location, for example, via a satellite link.

Figure 1:
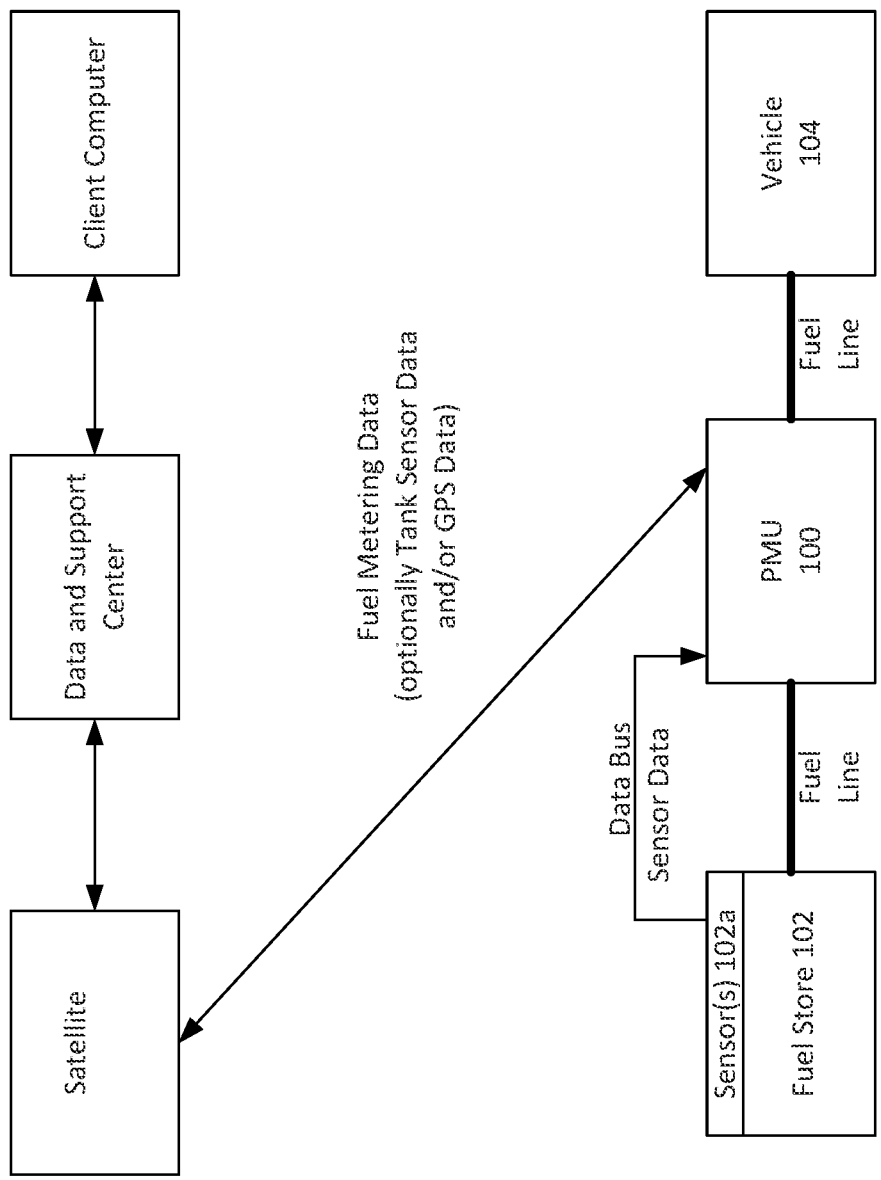
FIG. 1 shows a system for monitoring a fuel transfer operation, including a portable fuel metering unit (PMU).

FIG. 1 illustrates an embodiment of disclosed PMU 100 in the context a refueling operation wherein a vehicle 104 is being refueled using fuel stored in a fuel store 102. The fuel store 102 may be a fuel tank, for example, such as a fuel bladder. The fuel store 102 may be equipped with one or more monitoring sensors 102a, such as weight sensors, volume/level sensors, density sensors, temperature sensors, and the like. The PMU 100 may be configured between the fuel store 102 and the vehicle being refueled 104 such that fuel flows via a first fuel line from the fuel store, through the PMU, and then to the vehicle 104 via a second fuel line. The fuel may be propelled through the lines by a pump (not shown), differential pressure, differential fluid heights, or the like. The PMU 100 meters the flow of fuel transferred from the fuel store 102 to the vehicle 104. Specifically, the PMU may monitor the flow rate, from which the total amount of fuel transferred can be calculated. The PMU may also monitor parameters such as fuel temperature and/or density. The PMU can also be employed when filing the fuel store, for example, by configuring the PMU between a fuel delivery vehicle, such as delivery tanker and the fuel store to monitor the fuel as it is transferred from the delivery vehicle to the fuel store.

The PMU 100 may also be configured to receive data recorded by the sensors 102a of the fuel store 102 via a data bus or other transmission configuration. Data may be transmitted between the fuel store and the PMU according to a data communications protocol such as 4-20 mA or Modbus RTU, for example. The PMU 100 is configured to telemeter the data it measures and the data it receives from the sensors on the fuel store to a remote location. For example, the PMU may use a satellite link, such as an Iridium satellite constellation, to telemeter the measured data. In the illustrated system, the information/data sent via satellite link may be provided to a data and support center, whereby it can be made available to stakeholders who have an interest in monitoring the fuel transfer operation and/or the status of the fuel store. Parameters of the fuel transfer operation, such as the amount of fuel transferred, the flow rate, the fuel density, and fuel temperature can be measured and telemetered. The PMU may telemeter GPS data relating to the location of the fuel transfer operation as well. Alarms may be issued if any of the parameters are out of specification.

Figure 2A:
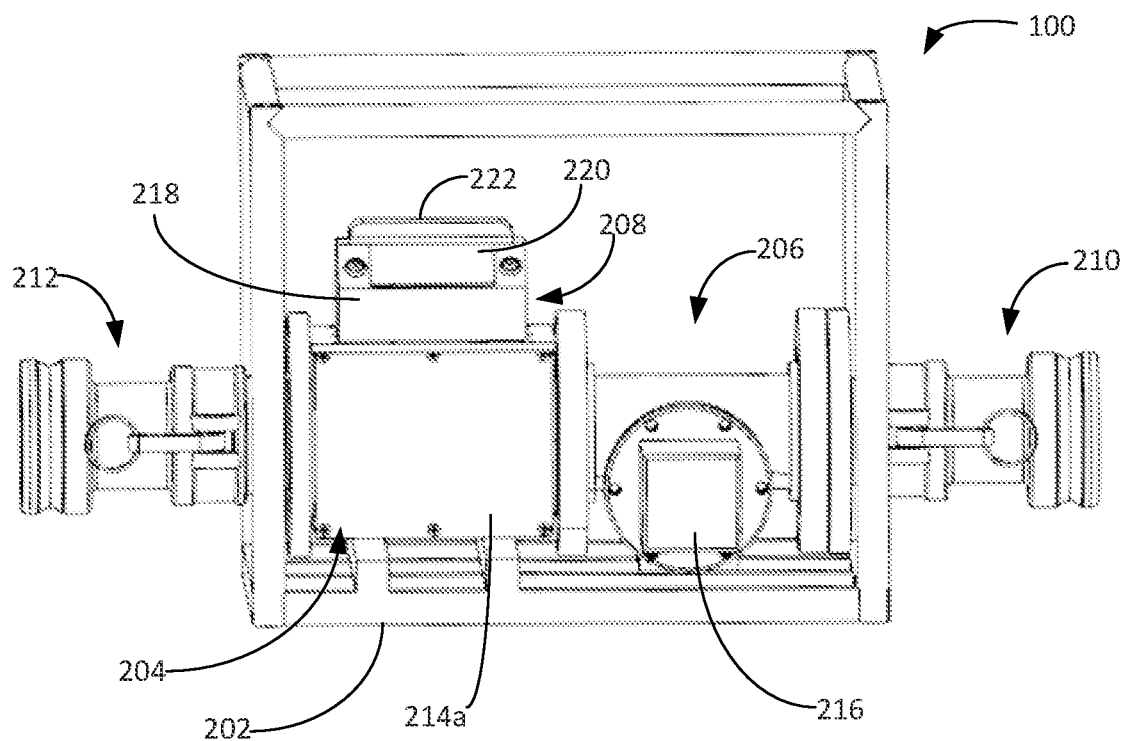
FIGS. 2A and 2B show views of a PMU.

FIG. 2A shows a first view of an embodiment of a PMU 100. The illustrated PMU 100 is configured in a metal frame 202. The PMU 100 comprises a flow meter section 204, an inline power generation section 206, and an electronics section 208. An inlet connector 210 and an outlet connector 212 are illustrated in FIG. 2A but are not discussed here in detail since connectors for connecting hoses to equipment for transferring fuel is well known in the art. For example, the connectors may comprise one or more of 3" male ANSI flange, a 4" male camlock to 3" female camlock adapter, and a 4" female camlock inlet/outlet. The flow meter section 204 contains the sensors (i.e., transducers) for measuring the flow of fluid through the PMU 100. As described below, the flow metering sensors may comprise any type of flow meter known in the art. The illustrated PMU 100 uses ultrasonic flow meter sensors (transducers), but other flow metering, such as Coriolis metering could be used. An example of a suitable ultrasonic flow meter transducer is a US0014 Ultrasonic Flow Sensor, available from Audiowell Electronics (Guangdong, China). The flow metering transducers are not shown in FIG. 2A, as the illustrated portion of the flow meter section 204 is covered by a first side lid 214a. The inline power generation section 206 is configured to generate power for the apparatus by converting energy of fuel flowing through the power generation unit into electrical energy. In the illustrated embodiment, the inline power generation section 206 contains an impeller connected to a generator, neither of which are visible in the view illustrated in FIG. 2A. The generator is contained with the generator housing 216. The electronics section 208 comprises an electronics housing 218 which contains the circuitry for operating PMU 100 and which is described in more detail below. One or more batteries may also be contained within the electronics housing 218. The electronics section may also comprise a display 220. The display 220 may be configured do display information relating to the PMU and/or one or more controls for controlling aspects of the PMU. The electronics section 208 also comprises a telemetry antenna 222, such as a satellite antenna attached to the electronics housing 218.

Figure 2B:
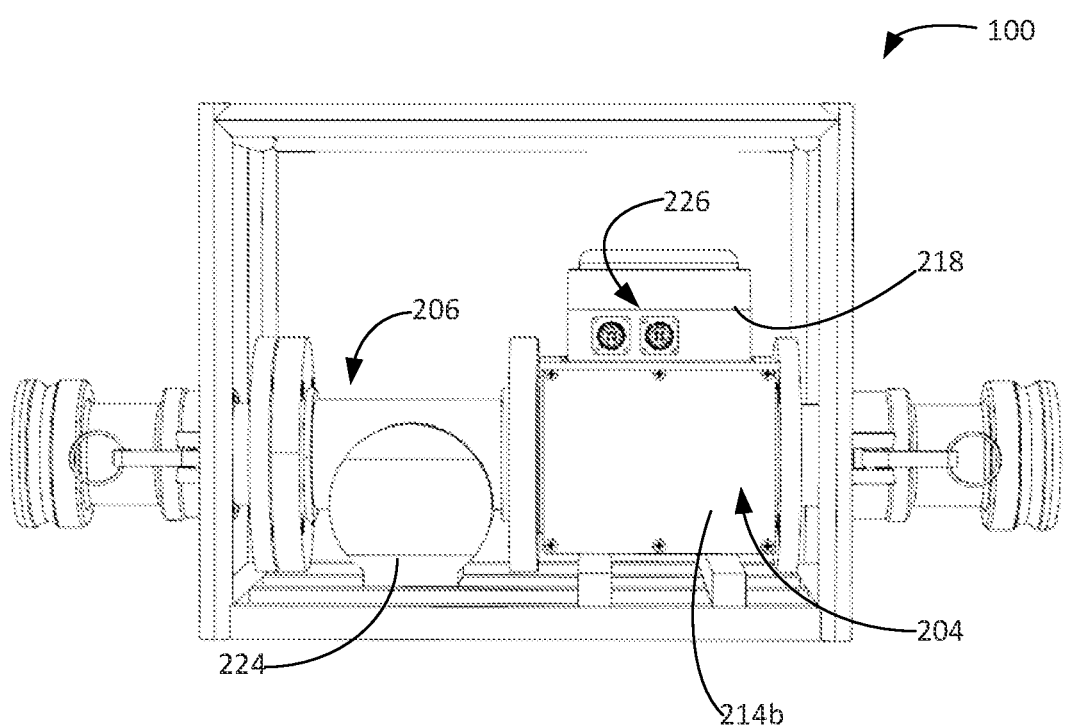

FIG. 2B shows a view of the PMU 100 from the opposite side illustrated in FIG. 2A. For clarity, features that were already discussed and labeled above with respect to 2A are not labeled in 2B unless they are discussed here as well. The view illustrated in FIG. 2b shows a second side lid 214b covering the flow meter section 204. As mentioned above, embodiments of the inline power generation section 206 contain an impeller, which is not visible. An impeller cover 224 is shown in FIG. 2B. As mentioned above with respect to FIG. 1, embodiments of the PMU 100 may be configured to receive data from external sensors, such as sensors configured within a fuel store/fuel tank. FIG. 2B shows plugs (or ports) 226 configured within the electronics housing for receiving data from such external sensors.

Figure 3A:
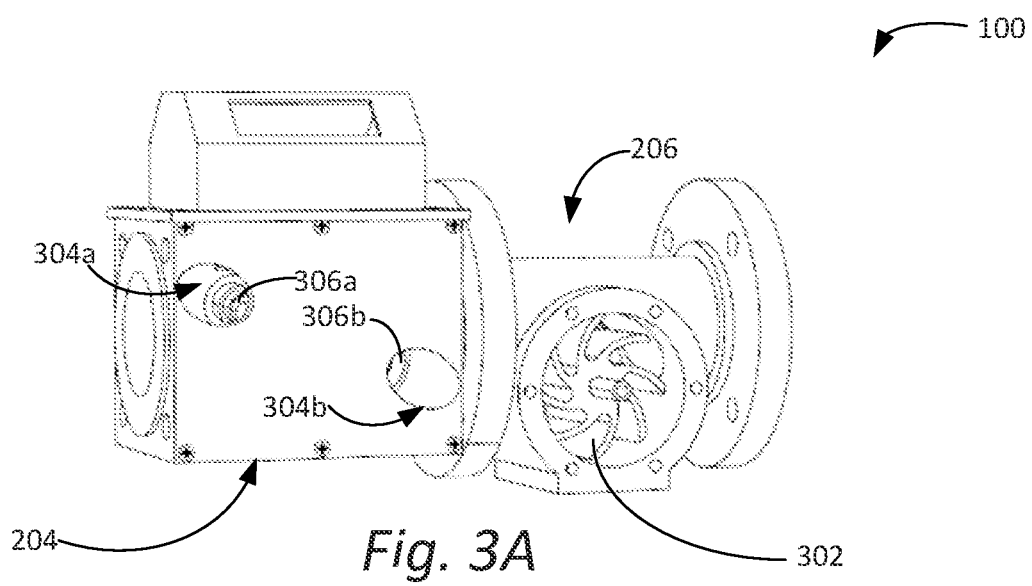
FIGS. 3A-3D show views of a PMU.
Figure 3B:
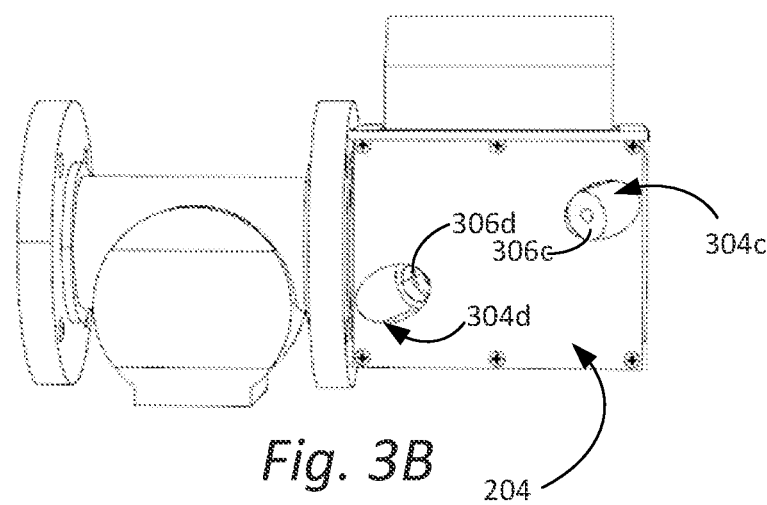
Figure 3C:
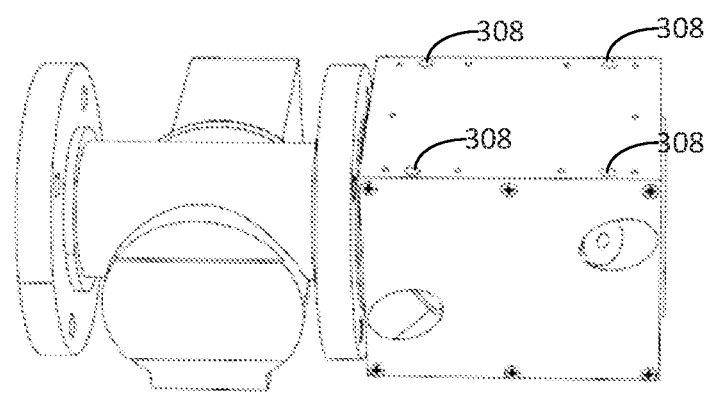

FIGS. 3A and 3B show views of the PMU 100 from opposite sides. The metal frame, inlet and outlet connectors, the side lids, and the generator and generator housing have all been removed. Since the generator and generator housing are removed, the impeller 302 is visible in FIG. 3A. In operation, fuel flowing through the PMU 100 turns the impeller 302, which provides rotary power to the generator (not shown). The generator generates electric power that can be used to power the PMU, or more likely, can be stored in a rechargeable battery, such as a nickel-cadmium (NiCd), nickel-metal hydride (NiMH), or lithium ion (Li-ion) battery, for powering the PMU. FIGS. 3A and 3B also show the configuration of the ultrasonic flow meter transducers in the flow meter section 204. As shown in FIGS. 3A and 3B, the flow meter section is configured with ports 304a-304d. Each of the ports contain an ultrasonic transducer 306a-306d, respectively. The transducers may be secured in the ports using epoxy or any other securing means. The operation of ultrasonic flow meters is well known in the art and is not discussed here in detail. Notice that the four transducers comprise two pairs of transducers. In other words, transducer 306a is paired with transducer 306d and transducer 306b is paired with transducer 306c. The vectors between the members of each pair form an "X" crossing through the fluid flow path through the flow meter section 204. FIG. 3C shows a view of the PMU 100 with the electronics housing removed so that wiring paths 308 are visible. The wiring paths 308 are provided for routing wiring from the ultrasonic transducers to the electronics contained within the electronics housing.

Figure 3D:
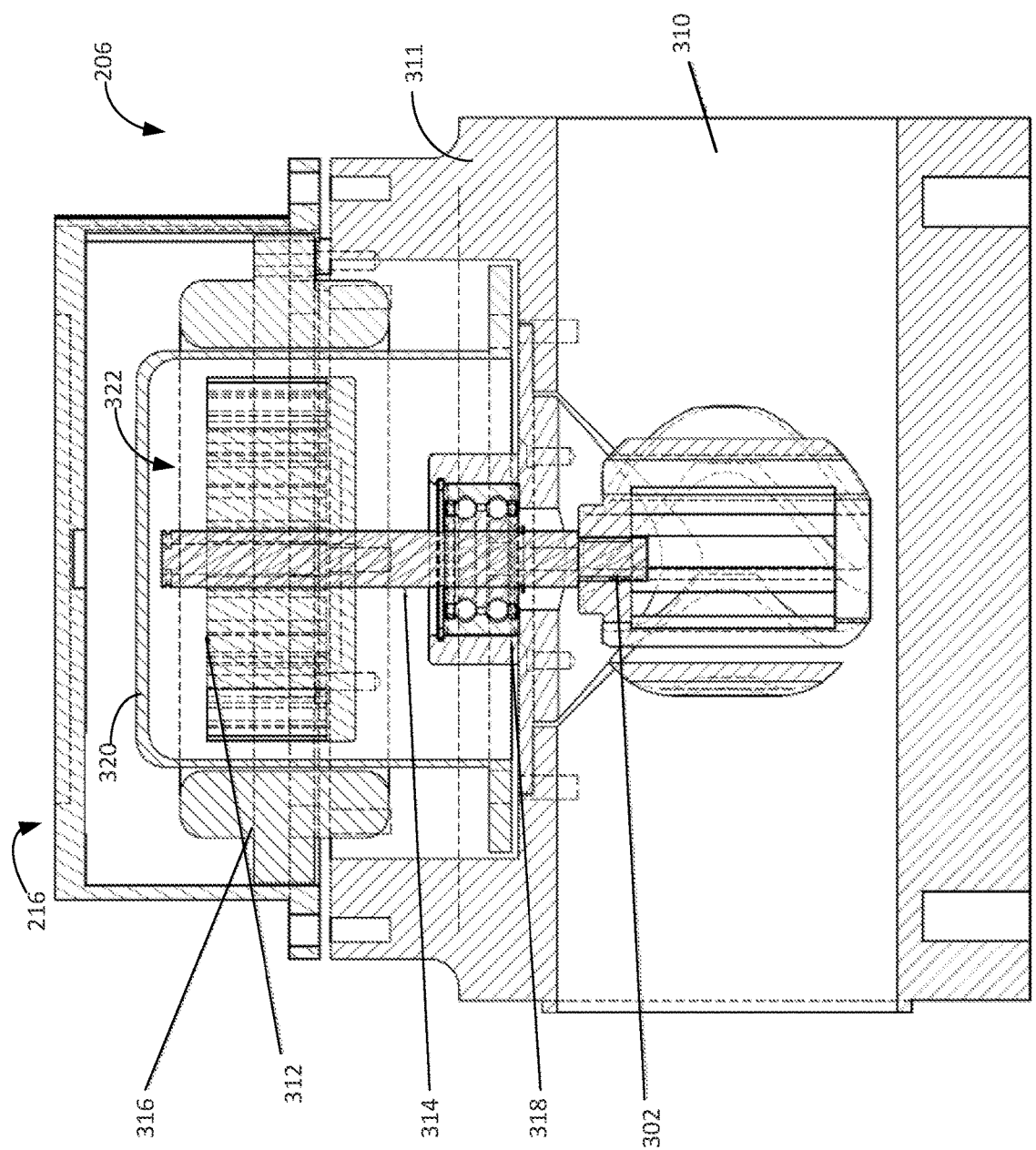

FIG. 3D shows a cross-section of the power generator section 206. The power generator section 206 comprises a flow cell (i.e., a flow path) 310, which is provided by a tubular path in the generator section housing 311 through which the fuel flows and activates the impeller 302. According to some embodiments the impeller 302 is bidirectional. The impeller may be spherical, as shown in FIG. 3D or may be rectangular, as shown in FIGS. 3A-3C. The impeller 302 is connected to a rotor 312 via a shaft 314. The impeller is configured with magnets that magnetically couple to a stator 316 when the rotor rotates, as powered by the fluid rotating the impeller 302. The rotor and 312 and stator 316 are contained within the generator housing 216, which bolts to the generator section housing 311. The shaft 314 is configured within a bearing assembly 318, which also may bolt to the generator section housing 311. The illustrated embodiment includes a rotor housing 320, which contains the rotor and is disposed between the rotor and stator. According to some embodiments, the rotor housing may be made of stainless steel. The rotor housing may be bolted to the generator section housing 311 and may include a gasket or o-ring between the two housings. According to some embodiments, fluid from within the flow cell 310 may enter the rotor compartment 322 formed by the rotor housing 320. For example, the fluid may enter the rotor compartment via spaces in the bearing assembly. Accordingly, the rotor 312 may be immersed in fluid during operation.

Electrical current induced in the stator by the rotation of the rotor may be used to power the PMU. According to some embodiments, current induced the windings of the stator is used to charge a rechargeable battery for powering the PMU. For example, voltage from the stator can be rectified and filtered to provide stable DC voltage to a battery charge controller. According to some embodiments, the battery charge controller may have an integrated step-up/step-down converter to maintain the correct charging profile for the battery. A diversion load (such as a resistor bank) may also be used to prevent over-voltage from the stator due to higher-than-expected turbine speeds. If an over-voltage is detected, power may be diverted to the resistors to help slow the impeller and protect the battery controller and other electronics. Power from the charge controller and batteries may be regulated and used to power the remaining electronics in the PMU. This creates an uninterruptible power supply for the electronics. If fluid flow slows or stops, the battery will continue to provide power.

Figure 4:
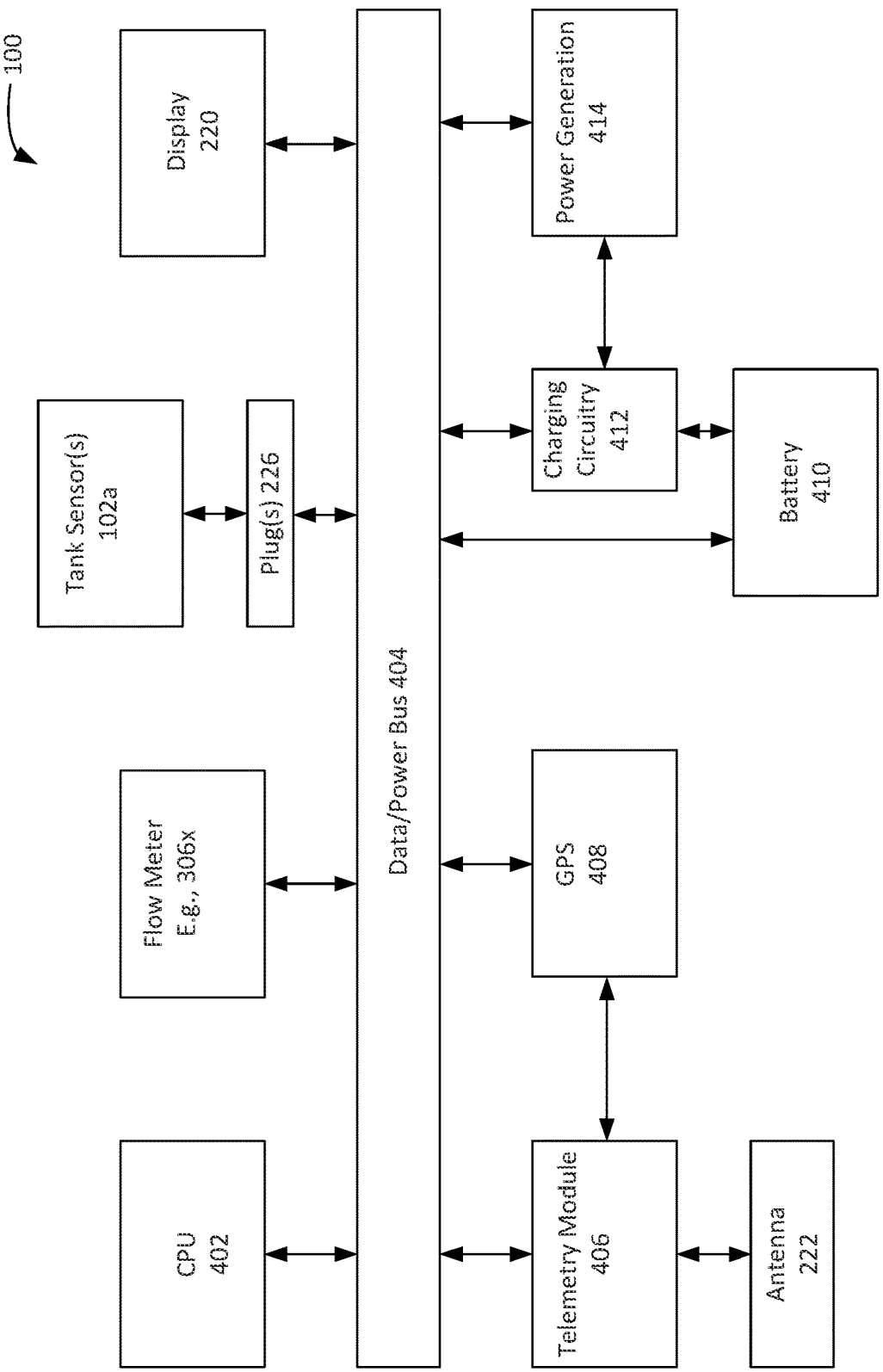
FIG. 4 shows an organizational schematic of components of a PMU.

FIG. 4 shows a schematic overview of the various operational components of an embodiment of a PMU 100, as disclosed herein. The various components are illustrated as interfacing with a data/power bus 404. But it should be noted that the data and power buses may be separate components and/or there may be more than one data and/or power buses. The PMU may be configured with one or more control units 402 (a.k.a. control circuitry), denoted in FIG. 4 as a central processing unit (CPU). The CPU 402 is configured to execute instructions for controlling the PMU. The CPU 402 may execute instructions stored on non-transitory computer readable media, such as magnetic, optical, or solid-state memories. The CPU may be a commercially available microprocessor, such as an INTEL CORE series processor, or may be an application-specific integrated circuit (ASIC). The CPU may interface with one or more programmable logic controllers (PLCs, not shown) configured to control aspects of the PMU's operations. The flow meter(s) and/or its related control circuitry may interface with the data/power bus 404. As mentioned above, the flow meter(s) may comprise ultrasonic transducers 306× (FIG. 3B) or other flow metering technology. As mentioned above, the PMU may be configured to interface with external sensors, for example, sensors configured with a fuel store (FIG. 1). Such sensors may interface with the data/power bus via one or more plugs (or ports) 226.

As mentioned above, the PMU is capable of telemetering data between the PMU and a remote location. Accordingly, the PMU comprises a telemetry module 406. The telemetry module interfaces with an antenna. As mentioned above, the telemetry may be satellite telemetry, for example, using an Iridium satellite constellation. The PMU may also include a GPS module 408 configured to telemeter the PMU's location (e.g., lat./lon.) to the remote site. The PMU may include one or more batteries 410 for powering the PMU. The batteries 410 may include essentially any battery technology. Examples include lead acid batteries and lithium-ion batteries. Lithium-ion batteries may be preferred because of their weight. The PMU may also be equipped with charging circuitry 412 for recharging the batteries. The recharging circuitry may obtain power from the power generation components 414 for recharging the batteries. The recharging circuitry may include rectification, if needed, charging control circuitry, and other aspects known in the art. Embodiments of the PMU also include self-contained power generation 414, such as the impeller and generator system described above. As explained above, the impeller 302 is disposed in the flow path for the fuel, such that when fuel flows through the PMU it powers the impeller. The impeller in turn power a magnetic generator. The generator can be a small permanent magnet motor generator, for example. The generator may produce a 12 V charging potential or any other voltage, according to the particular design constraints. Other power generation components may alternatively (or additionally) be used for charging the batteries (and/or powering the PMU), such as wind power, solar power, and the like.

While the invention herein disclosed has been described in terms of specific embodiments and applications thereof, numerous modifications and variations could be made thereto by those skilled in the art without departing from the scope of the invention set forth in the claims.

What is claimed is:

1. A system for monitoring a transfer of fuel between a fuel store and a fuel receiver, the system comprising:
   a portable metering unit (PMU) configurable between the fuel store and the fuel receiver so that fuel flows through the PMU during the transfer, wherein the PMU comprises:
   a flow meter comprising one or more sensors configured to measure one or more parameters of the fuel as it a flows between the fuel source and the fuel receiver, wherein the one or more parameters comprises flow rate,
   a data port configured to receive fuel store data from one or more fuel store sensors configured at the fuel store,
   a telemetry unit configured to telemeter data indicative of the one or more parameters and the fuel store data to a remote location, and
   a power generation unit comprising a generator configured to generate power for the flow meter and the telemetry unit by converting energy of fuel flowing through the power generation unit into electrical energy and providing the electrical energy to a bus, whereby the electrical energy is provided to the flow meter and the telemetry unit.

2. The system of claim 1, wherein the PMU further comprises charging circuitry configured to use the electrical energy to charge a battery.

3. The system of claim 1, wherein the PMU weighs less than 200 pounds.

4. The system of claim 1, wherein the PMU weighs less than 100 pounds.

5. The system of claim 1, wherein the PMU comprises a global positioning system (GPS) transceiver.

6. The system of claim 1, wherein the one or more sensors comprise ultrasonic flow sensors.

7. The system of claim 1, wherein the power generation unit comprises a flow path and an impeller configured so that fluid flowing through the flow path activates the impeller.

8. The system of claim 7, wherein the impeller is bidirectional.

9. The system of claim 8, wherein the power generation unit further comprises a rotor and a stator configured so that activation of the impeller causes the rotor to rotate within the stator, thereby generating electric current in the stator.

10. The system of claim 9, wherein the impeller is connected to the rotor by a shaft that passes through a bearing assembly configured between the impeller and the rotor, wherein the bearing assembly is permeable to fuel within the flow path.

11. The system 9, wherein the rotor is configured within a rotor housing having one or more walls configured between the rotor and the stator.

12. The system of claim 11, wherein the rotor housing defines a rotor compartment configured to contain the rotor and configured such that, during operation, fuel from the flow path seeps into the rotor compartment.

13. The system of claim 1, wherein the PMU further comprises one or more batteries configured to store electrical energy generated by the power generation unit.

14. The system of claim 1, wherein the PMU further comprises a display configured to display one or more of the measured parameters.

15. The system of claim 1, wherein the one or more sensors configured at the fuel store comprise one or more of weight sensors, volume sensors, level sensors, density sensors, and temperature sensors.

16. The system of claim 1, further comprising a data bus configured to couple the data port to the one or more fuel store sensors.

17. The system of claim 1, wherein the telemetry unit comprises a satellite antenna.

18. A method of monitoring a transfer of fuel between a fuel source and a fuel receiver, the method comprising:
  configuring a portable metering unit (PMU) between the fuel store and fuel receiver by attaching a first fuel line from the fuel store to an input connector of the PMU and attaching a second fuel line from an output connector of the PMU to the fuel receiver, so that fuel flows through the PMU during the transfer,
  wherein the PMU comprises:
    a flow meter comprising one or more flow sensors configured to measure one or more parameters of the fuel as it a flows between the fuel source and the fuel receiver, wherein the one or more parameters comprises flow rate,
    a data port configured to receive fuel store data from one or more fuel store sensors configured at the fuel store,
    a telemetry unit, and
    a power generation unit comprising a generator configured to generate power for the flow meter and the telemetry unit by converting energy of fuel flowing through the power generation unit into electrical energy and providing the electrical energy to a bus, whereby the electrical energy is provided to the flow meter, telemetry unit.

19. The method of claim 18, further comprising using the one or more flow sensors to measure the one or more parameters of the fuel as it a flows between the fuel source and the fuel receiver and using the telemetry unit to send data indicative of the one or more parameters to remote location.

20. The method of claim 19, further comprising using the data port to receive the fuel store data from the one or more fuel store sensors and using the telemetry unit to send the fuel store data to a remote location.

* * * * *